A. T. HARRISON.
Grain-Drill.

No. 54,534. Patented May 8, 1866.

Witnesses:
R. V. Campbell
Edw. Schafer

Inventor:
A. T. Harrison
per W. Morris Smith
Attorney

UNITED STATES PATENT OFFICE.

A. T. HARRISON, OF CLINTON, ILLINOIS.

IMPROVEMENT IN CULTIVATORS.

Specification forming part of Letters Patent No. 54,534, dated May 8, 1866.

*To all whom it may concern:*

Be it known that I, A. T. HARRISON, of Clinton, in De Witt county, and State of Illinois, have invented a new and useful Machine for Planting and Cultivating Cotton; and I do hereby declare that the following is a full, clear, and exact description thereof, reference being had to the accompanying drawings, through letters of reference marked thereon, forming part of this specification, and in which—

Figure 1:
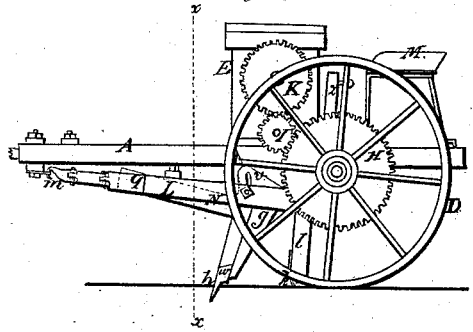
Figure 2:
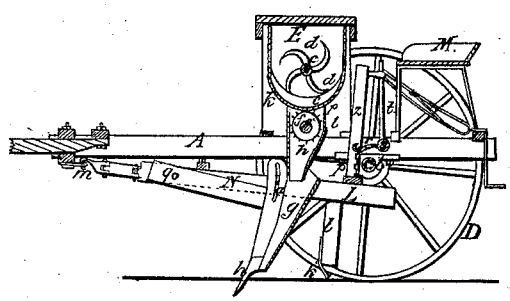
Figure 3:
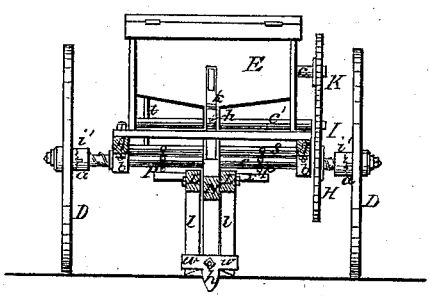
Figure 5:
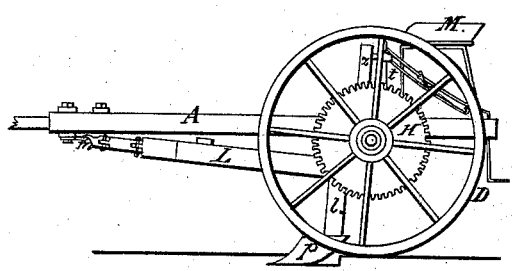
Figure 4:
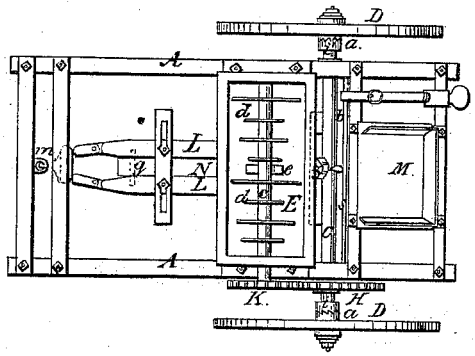
Figure 6:
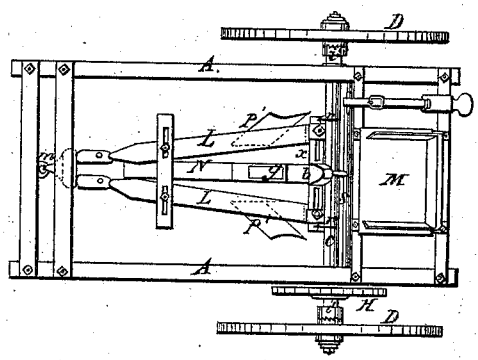

Figure 1 represents a side elevation of my machine as arranged for planting and covering the seed. Fig. 2 is a vertical section taken longitudinally through the center of the same. Fig. 3 is a transverse section taken on the line $x\,x$ of Fig. 1. Fig. 4 is a top view of the machine with the lid of the seed-hopper removed. Fig. 5 is a side elevation of the machine as arranged for cultivating. Fig. 6 is a top view of the same.

The object of this invention is to provide a machine that is at once a perfect cotton seeder or planter and may be easily transformed into a cultivator, thus saving much expensive machinery commonly used in raising a crop.

To enable others skilled in the art to make and use my invention, I will proceed to describe its construction and operation by referring to the drawings, in which—

A represents the framing of the machine, to which are adapted, on its under side, suitable boxes $b$ for the revolving axle C to rotate in. On each end of this axle are mounted the traveling wheels D, in a manner that will be hereinafter described. On the top of this frame A I attach a seed-hopper, E, a little in advance of the axle and extending from side to side, which is connected with the frame by bolts or other suitable means, so that it may be easily removed at pleasure. The lower half of this hopper, as shown in the drawings, is of a semi-cylindrical form and inclined from each end to the center, in order to give the seed a tendency toward the egress-aperture $e$ in the center of the bottom. In the upper half the sides rise vertically, so that it assumes a rectangular form at the top. In this hopper is a revolving shaft, $c$, arranged longitudinally through its center, which is provided with a series of curved radial arms, $d$, which are pointed at their ends, and when rotated serve to lighten up the seed and, in combination with the inclined bottom, to draw it toward the egress-aperture $e$. Immediately beneath this aperture is a small wheel, $f$, provided with teeth around its periphery similar to those of a carding-machine, which serve to separate the seeds and convey them into the seeding-spout $g$, to be deposited in the ground.

The wheel $f$ is incased in a jacket, $h$, the upper half of which is made fast to the bottom of the hopper, and the lower half, parting on the level of the axis of the wheel, is hinged to it at the front and secured to it at the back and sides by spring-catches $i$, so that in case it should become clogged it can easily be opened and cleared. The opening of the aperture $e$ is regulated or closed by the slide $k$.

On the axle C, just outside the frame A, is firmly keyed a spur-wheel, H, which gears into the wheel I on the axle of the seeding-wheel $f$, while the wheel I gears into another spur-wheel, K, on the axle of the shaft $c$ of the agitator, and thus motion is communicated to those shafts by the rotation of the traveling wheels D.

The wheels D are both loose on the axle C, and on the inner side of each I provide a ratchet-clutch, $i'$, which slide on feathers in the axle, and are forced against the hubs by spiral springs $n$ around the axle. By this means, when traveling straight forward, both wheels hold upon and rotate the axle with them, while in turning a corner in either direction the wheel that makes the largest circuit rotates the axle, and the ratchet-clutch of the other will slip, thus avoiding any drag upon the ground.

Immediately in front of and at the bottom of the seeding-spout $g$ is attached a gopher, $h$, which opens the furrow for the reception of the seed, and which is provided with lateral wings $w$, which serve to break or displace any clods of earth that may be thrown up. It is supported on a vertical timber connected with a longitudinal piece, N, which is pivoted between the two side pieces, L, at $q$, and is provided with a slot, $v$, through which and the pieces L a bolt is passed to clamp it, and thus regulate the depth of the furrow with regard to the scraper $k'$, which is attached to the legs $l$ in rear of the gopher, and is concave on its face and under side, so as to close the earth in upon and cover the seed deposited.

The frame L, which carries the gopher and scraper, is attached to the main frame of the carriage at its front end by a clevis, $m$, and is supported by chains $p$ and arms $r$ on a rocking shaft, $s$, which is provided with a vertical arm or lever, $t$, by which the driver can regulate the depth of the furrow by lowering or raising the gopher and scraper-frame.

On the rear portion of the frame A is arranged a seat, M, in convenient position for the driver to operate the several adjustable portions of the machine, as well as to drive his team.

The seeding season being passed and that work performed, the planter wants to cultivate his crop, so in order to adapt the machine for that purpose I remove the seed-hopper E from the frame A, which carries with it the two shafts $c$ and $c'$. I then remove the gopher $h$ and substitute a pair of Cary plows, $p'$, (right and left hand,) for the scraper $k$ on the legs $l$.

In cultivating cotton the earth is first thrown from the plants, and in the next plowing is thrown toward them, which may be accomplished in two ways. The beams L of the two plows are made adjustable and are secured in position by means of the cross-beam $x$, which connects them at the rear end having bolts passing through slots therein, so that they may be fixed at such a distance apart as to straddle the plants while small. Each plow throwing the earth outward will remove it from the plant, and on the second plowing the machine is run between the plants, so that the plows turn the earth back toward them; or when the plants become so large as to preclude the possibility of straddling them, then the plows are arranged so that they throw the earth toward each other in the center at the first plowing, after which they are transposed on the legs $l$, so as to throw it outward toward the plants at the second plowing.

The cross-beam $x$ is also provided with a vertical shaft or handle, $z$, which rises in front of the driver, by means of which he can hold and steady the plows, and at the same time can regulate the depth of the furrow by means of the lever $t$ and rocking shaft $s$, as hereinbefore described.

Having thus described my invention, what I claim as new, and desire to secure by Letters Patent, is—

1. The revolving agitator with curved and pointed arms, in combination with the double-inclined cylindrical hopper-bottom, substantially as and for the purposes set forth.

2. The hinged casing of the seeding-wheel, in combination with said wheel $f$, as and for the purposes described.

3. The combination of the wings $w$ with the gopher $h$, as and for the purposes specified.

Witness my hand this 8th day of March, A. D. 1866.

A. T. HARRISON.

Witnesses:
 CHARLES H. DENNETT,
 SOLOMON F. LEWIS.